(12) United States Patent
Yamauchi et al.

(10) Patent No.: US 9,547,576 B2
(45) Date of Patent: Jan. 17, 2017

(54) MULTI-CORE PROCESSOR SYSTEM AND CONTROL METHOD

(71) Applicant: FUJITSU LIMITED, Kawasaki-shi, Kanagawa (JP)

(72) Inventors: Hiromasa Yamauchi, Usakos (NA); Koichiro Yamashita, Hachioji (JP); Takahisa Suzuki, Yokohama (JP); Koji Kurihara, Kawasaki (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 212 days.

(21) Appl. No.: 14/151,421

(22) Filed: Jan. 9, 2014

(65) Prior Publication Data

US 2014/0129811 A1     May 8, 2014

Related U.S. Application Data

(63) Continuation of application No. PCT/JP2011/066011, filed on Jul. 13, 2011.

(51) Int. Cl.
*G06F 11/34*     (2006.01)
*G06F 9/50*     (2006.01)

(52) U.S. Cl.
CPC ........... *G06F 11/3409* (2013.01); *G06F 9/505* (2013.01); *G06F 2209/501* (2013.01); *G06F 2209/5021* (2013.01)

(58) Field of Classification Search
CPC .................... G06F 11/3409; G06F 2209/5021; G06F 9/505; G06F 2209/501
See application file for complete search history.

(56) References Cited

U.S. PATENT DOCUMENTS

2008/0189510 A1*   8/2008   Riddoch ............. G06F 13/4221
                                                     711/211
2009/0327944 A1* 12/2009   Sugure ................ G06F 17/5022
                                                     715/772

(Continued)

FOREIGN PATENT DOCUMENTS

| EP | 0982660 | 3/2000 |
|---|---|---|
| JP | 7-121488 | 5/1995 |

(Continued)

OTHER PUBLICATIONS

Japanese Office Action dated Oct. 7, 2014 in corresponding Japanese Patent Application No. 2013-523748.

(Continued)

*Primary Examiner* — Charles E Anya
(74) *Attorney, Agent, or Firm* — Staas & Halsey LLP

(57) ABSTRACT

A multi-core processor system includes a multi-core processor that has plural core groups; and a storage device that stores a constraint on execution time for each application. A first identified core of the multi-core processor is configured to identify a constraint on execution time of a given application that is among the applications and for which an invocation instruction is received; determine whether the identified constraint meets a performance drop condition; assign the given application to a predetermined core of the multi-core processor, upon determining that the identified constraint meets the performance drop condition; and notify a second identified core of a core group among the core groups, of an assignment instruction for the given application, upon determining that the identified constraint does not meet the performance drop condition.

8 Claims, 17 Drawing Sheets

(56) References Cited

U.S. PATENT DOCUMENTS

| | | | |
|---|---|---|---|
| 2010/0100706 A1* | 4/2010 | Inoue | G06F 9/5077 |
| | | | 712/30 |
| 2010/0268912 A1* | 10/2010 | Conte | G06F 9/4856 |
| | | | 712/20 |
| 2010/0312992 A1 | 12/2010 | Wakabayashi et al. | |
| 2011/0004883 A1* | 1/2011 | El-Moursy | G06F 9/4881 |
| | | | 718/103 |
| 2012/0143838 A1* | 6/2012 | Ross | G06F 9/30105 |
| | | | 707/704 |
| 2012/0233477 A1* | 9/2012 | Wu | G06F 1/3287 |
| | | | 713/320 |

FOREIGN PATENT DOCUMENTS

| | | |
|---|---|---|
| JP | 7-248967 | 9/1995 |
| JP | 2000-76205 | 3/2000 |
| JP | 8-152903 | 5/2003 |
| JP | 2006-277637 | 10/2006 |
| JP | 2007-226587 | 9/2007 |
| JP | 2008-158687 | 7/2008 |
| JP | 2010-72731 | 4/2010 |
| JP | 2010-286898 | 12/2010 |
| WO | WO2009110084 | 9/2009 |

OTHER PUBLICATIONS

PCT International Preliminary Report on Patentability mailed Jan. 23, 2014 in corresponding International Application No. PCT/JP2011/066011.

* cited by examiner

FIG.2

| APP ID | APP FLAG | LOAD | |
|---|---|---|---|
| APP A | 1 | 30 | ~201-1 |
| APP B | 0 | 30 | ~201-2 |
| ⋮ | ⋮ | ⋮ | ⋮ |

FIG.3

| CPU ID | TIME | FLAG | ASSIGNED APP | |
|---|---|---|---|---|
| CPU 111-1 | 12:00:01 | ... | ... | ~301-1 |
| CPU 111-2 | 11:00:05 | ... | ... | ~301-2 |
| ⋮ | ⋮ | ⋮ | ⋮ | ⋮ |
| CPU 114-4 | ... | ... | ... | |

FIG.4

| DISPATCH-DESTINATION CPU INFORMATION |
|---|
| CPU 112-2 |

| CPU ID | TIME | FLAG | ASSIGNED APP | BUS PRIORITY | |
|---|---|---|---|---|---|
| CPU 111-1 | 12:00:01 | 0 | ... | 1 | ~1401-1 |
| CPU 111-2 | 11:00:05 | 0 | ... | 1 | ~1401-2 |
| ⋮ | ⋮ | ⋮ | ⋮ | ⋮ | ⋮ |
| CPU 114-4 | ... | ... | ... | ... | |

| CPU ID | CACHE MODE | |
|---|---|---|
| CPU 112-1 | CACHE | ~1501-1 |
| CPU 112-2 | CACHE | ~1501-2 |
| CPU 112-3 | CACHE | ~1501-3 |
| CPU 112-4 | CACHE | ~1501-4 |

FIG.17

| CPU ID | CACHE MODE |
|---|---|
| CPU 112-1 | NON-CACHE |
| CPU 112-2 | CACHE |
| CPU 112-3 | NON-CACHE |
| CPU 112-4 | NON-CACHE |

1500

1501-1
1501-2
1501-3
1501-4

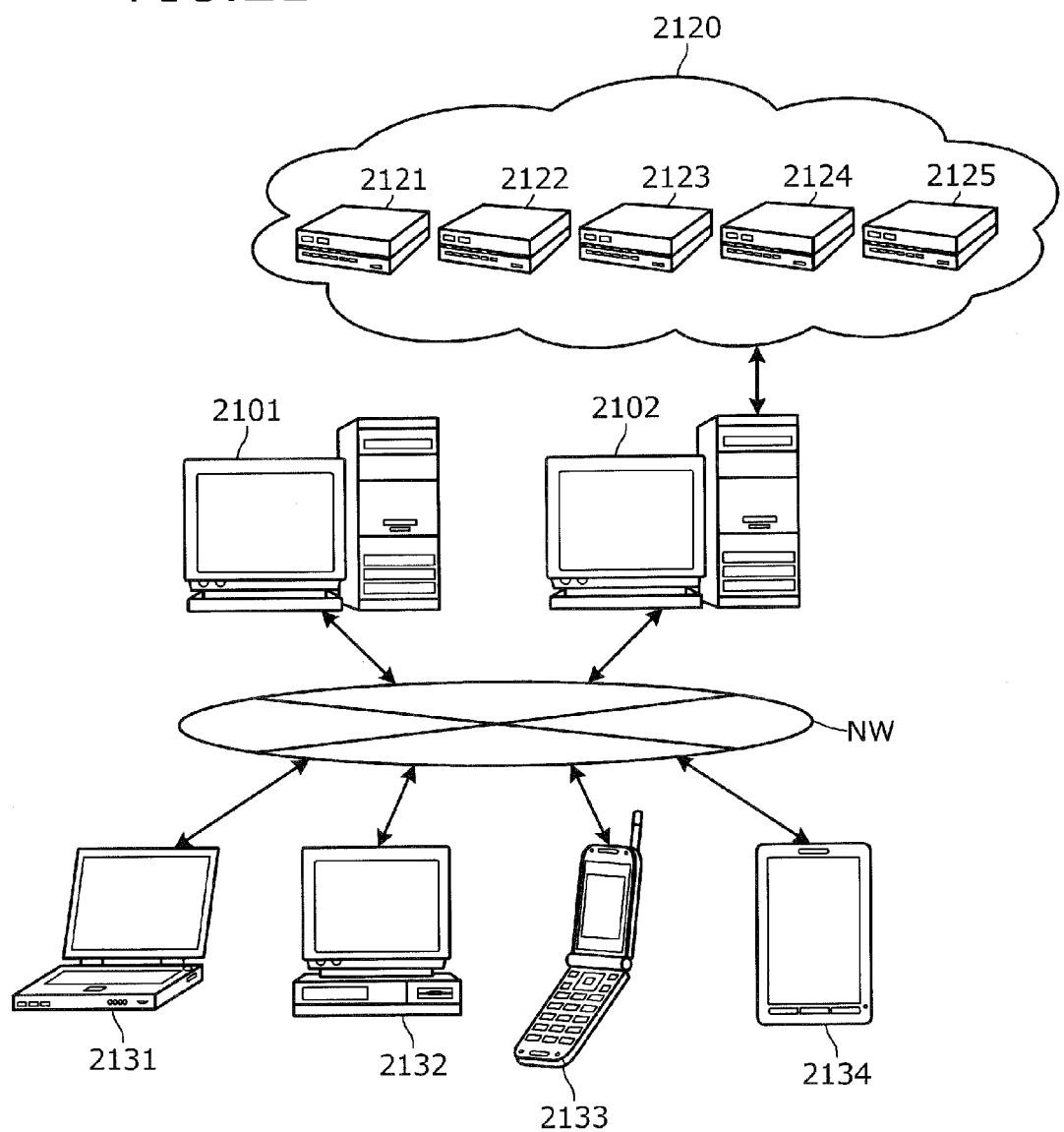

MULTI-CORE PROCESSOR SYSTEM AND CONTROL METHOD

CROSS REFERENCE TO RELATED APPLICATIONS

This application is a continuation application of International Application PCT/JP2011/066011, filed on Jul. 13, 2011 and designating the U.S., the entire contents of which are incorporated herein by reference.

FIELD

The embodiments discussed herein are related to a multi-core processor system that controls assignment of applications, and a control method.

BACKGROUND

In a multi-core processor system, techniques are known in which a multi-core processor includes a master central processing unit (CPU) and a slave CPU, where the master CPU assigns applications (hereinafter, referred to as apps) to the slave CPU.

According to a related technique, for example, when plural CPUs share cache memory, the cache memory capacities available to the CPUs are dynamically assigned according to the priority of the processing executed by the CPU.

Another technique is known in which, for example, the multi-core processor includes a master CPU and plural slave CPUs, where the slave CPUs are grouped and operate under the instruction of the master CPU. According to another technique, for example, processing under execution by a CPU (or a CPU group) is migrated to another CPU (another CPU group).

Nonetheless, if the master CPU performs the overall scheduling for the plural slave CPUs, the master CPU may become overloaded, causing the scheduling to consume more time. If the multi-core processor is grouped into groups that each includes plural CPUs and performs the scheduling by a general master CPU and a group master CPU, the scheduling is be performed twice, causing more time to be consumed for scheduling. With such scheduling, when assignment to a group by the general master CPU occurs, the group master CPU performs assignment to the CPUs in the.

SUMMARY

According to an aspect of an embodiment, a multi-core processor system includes a multi-core processor that has plural core groups; and a storage device that stores a constraint on execution time for each application. A first identified core of the multi-core processor is configured to identify a constraint on execution time of a given application that is among the applications and for which an invocation instruction is received; determine whether the identified constraint meets a performance drop condition; assign the given application to a predetermined core of the multi-core processor, upon determining that the identified constraint meets the performance drop condition; and notify a second identified core of a core group among the core groups, of an assignment instruction for the given application, upon determining that the identified constraint does not meet the performance drop condition.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is an explanatory view of an example of an app table;

FIG. 3 is an explanatory view of an example of a CPU table;

FIG. 4 is an explanatory view of an example of dispatch-destination CPU information;

FIG. 14 is an explanatory view of an example of a CPU table used in a second embodiment;

FIG. 15 is an explanatory view of an example of cache mode setting information;

FIG. 17 is an explanatory view of an example of cache mode setting information 1500 after setting;

FIG. 21 is a diagram of an example of application of the multi-core processor system 100 depicted in FIG. 1.

DESCRIPTION OF EMBODIMENTS

Embodiments of a multi-core processor system and a control method will be described in detail with reference to the accompanying drawings. In the multi-core processor system, a multi-core processor is a processor that is equipped with plural cores, and may be provided as a single processor equipped with plural cores or a group of single-core processors arranged in parallel. In the present embodiment, for the sake of simplicity, description will be given taking a group of parallel, single-core processors as an example.

Figure 1:
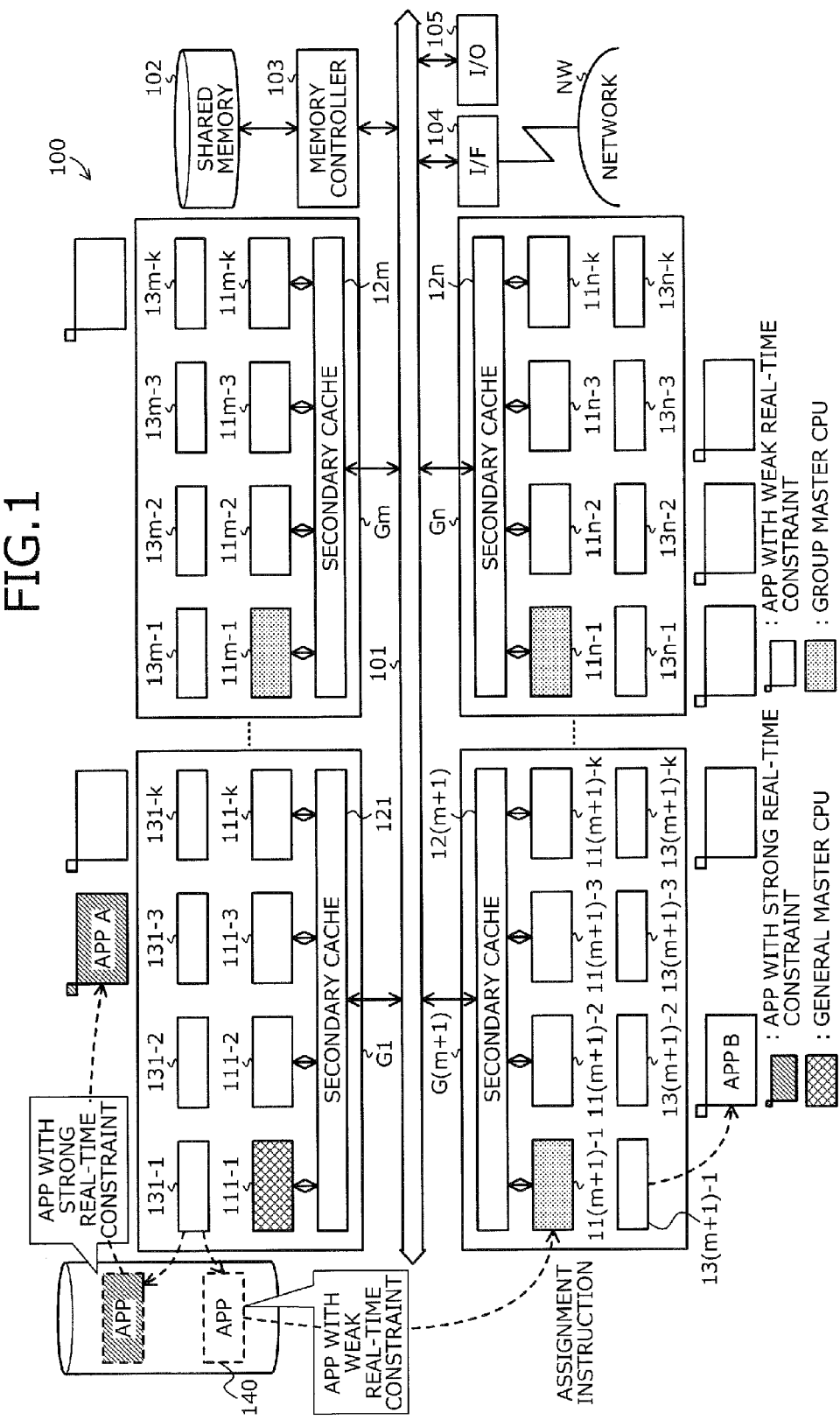
FIG. 1 is an explanatory view of an embodiment.

FIG. 1 is an explanatory view of an embodiment. In a multi-core processor system 100, plural CPUs forming multi-core processors are grouped in advance into groups G1 to Gn (n≥1). For example, CPUs 111-1 to 111-$k$ belong to the group G1 and CPUs 11$m$-1 to 11$m$-$k$ belong to a group Gm (1<m≤n). CPUs 11($m$+1)-1 to 11($m$+1)-k belong to a group G($m$+1) and CPUs 11$n$-1 to 11$n$-$k$ belong to the group Gn. k is a predetermined value such as 2, 4, and 8 that is determined in advance by a designer of the multi-core processor system 100.

The CPU 111-1 acts both as a general master CPU that provides overall control of the multi-core processors and as a group master CPU that controls a CPU 111-2 to the CPU 111-$k$ belonging to the group G1. The CPUs 111-2 to 111-$k$ are slave CPUs. The CPUs 11$m$-1, 11($m$+1)-1, and 11$n$-1 are included in the groups Gm to Gn and serve as the respective group master CPUs that control the groups Gm to Gn, respectively. The CPUs 111-2 to 111-$k$, a CPU 11$m$-2 to the CPU 11$m$-$k$, a CPU 11($m$+1)-2 to the CPU 11($m$+1)-k, and a CPU 11$n$-2 to the CPU 11$n$-$k$ are slave CPUs.

A storage device such as shared memory 102 stores a table that describes for each app, a constraint (hereinafter, "real-time constraint") related to the execution time. The real-time constraint is, for example, the number of milliseconds [ms] within which execution should be completed after the reception of an invocation instruction. For example, the constraint on app A is to complete the execution within 3 [ms] after the reception of an invocation instruction. For example, the constraint on app B is to complete the execution within 1 [ms] after the reception of an invocation instruction.

The CPU 111-1 acting as the general master CPU first identifies from the storage device, a constraint on the execution time of a given app to which an invocation instruction has been received. For example, the given app is assumed to be the app A. The CPU 111-1 determines whether the identified constraint meets a performance drop condition. A performance drop condition is a condition under which, for example, when the group master CPU of a group is notified of an assignment instruction and assigns an app to a CPU in the group, the performance of the app will degrade. For example, a performance drop condition is a condition determining whether the sum of the assignment time and the app execution time can conform to the constraint. The performance drop condition is determined in advance by simulation at the time of app design.

An app that meets the performance drop condition is an app that has a strong real-time constraint and an app that does not meet the performance drop condition is an app that has a weak real-time constraint. An app that has a strong real-time constraint may be substantially affected by the assignment time and the app performance may degrade. An app that has a weak real-time constraint may be less affected by the assignment time than an app having a strong real-time constraint and therefore, the app performance has a low potential of being degraded consequent to the assignment time. For example, assuming that the performance drop condition is within 50 [ms], since the app A has a constraint of 3 [ms] for example, the constraint of the app A falls within 50 [ms]. It is thus determined that the constraint of the app A meets the performance drop condition. Accordingly, the app A is an app having a strong real-time constraint.

When an identified constraint is determined to meet the performance drop condition, the CPU 111-1 assigns a given app to a CPU determined from among the multi-core processors. In FIG. 1, the determined CPU is a CPU 111-3 and the app A is assigned to the CPU 111-3. Since the app B has a constraint of 1 [s] for example, the constraint of the app B is greater than 50 [ms]. The constraint of the app B is thus determined not to meet the predetermined condition. Accordingly, the app B is an app having a weak real-time constraint.

When a identified constraint is determined not to meet the performance drop condition, the CPU 111-1 gives to a group master CPU of a group among the groups G1 to Gn, notification of an assignment instruction for given app. In FIG. 1, the CPU 111($m$+1)-1 of the group G($m$+1) is notified of the assignment instruction and assigns the app B to the CPU 11($m$+1)-2. In this embodiment, although CPU processing is described to be performed in units of apps, the CPU processing is not limited hereto and may be performed in units of threads, for example.

The multi-core processor system 100 will be described in detail. The multi-core processor system 100 includes the CPUs 111-1 to 111-$k$, 11$m$-1 to 11$m$-$k$, 11($m$+1)-1 to 11($m$+1)-k, and 11$n$-1 to 11$n$-$k$. The multi-core processor system 100 further includes the shared memory 102, a memory controller 103, an I/F 104, and an I/O 105, respectively connected via a bus 101.

The CPUs 111-1 to 111-$k$, 11$m$-1 to 11$m$-$k$, 11($m$+1)-1 to 11($m$+1)-k, and 11$n$-1 to 11$n$-$k$ execute OSs 131-1 to 131-$k$, 13$m$-1 to 13$m$-$k$, 13($m$+1)-1 to 13($m$+1)-k, and 13$n$-1 to 13$n$-$k$, respectively.

The OS 131-1 is a general master OS of the multi-core processors and is a master OS of the group G1. The OS 131-1 includes a wait queue 140. When apps are stacked into the wait queue 140, the OS 131-1 determines that an app invocation instruction has been received. OSs 132-1, 133-1, and 134-1 are master OSs of groups G2, G3, and G4, respectively.

The OSs 131-1 to 131-$k$, 13$m$-1 to 13$m$-$k$, 13($m$+1)-1 to 13($m$+1)-k, and 13$n$-1 to 13$n$-$k$ have respective run queues not depicted. Pointers to context information concerning apps assigned to the CPU are stacked in the run queues. The context information is, for example, information that includes the execution status of a loaded app and a variable in the app. The OSs acquire a context information pointer in the run queue to access the context information of an app and thereby, can immediately execute the app.

A primary cache included in each CPU temporarily stores data written to the shared memory 102 by an app executed by an OS. Each primary cache temporarily stores data read from the shared memory 102. The primary caches of CPUs respectively belonging to the groups G1 to Gn are connected via a snoop circuit. When data shared by the primary caches of CPUs belonging to a group is updated in one of the primary caches, the snoop circuit detects the update and updates the data in the other primary caches.

The groups G1 to Gn respectively have share secondary caches 121 to 12$n$ that are shared by the CPUs belonging to the group G1 to Gn. The secondary caches 121 to 12$n$ each include cache memory and a cache controller. The secondary caches 121 to 12$n$ store data pushed out from the primary caches of CPUs. The secondary caches 121 to 12$n$ have a larger storage capacity and a lower access speed by the CPUs than the primary caches. The secondary caches 121 to 12$n$ have a smaller storage capacity and a higher access speed by the CPUs than the shared memory 102.

The shared memory 102 may be, for example, ROM, RAM, flash ROM, and the like. The ROM stores programs, such as a boot program. The RAM is used as a work area of the CPUs 111 to 11$n$-$k$. The flash ROM stores system software such as the OS, as well as app programs. The flash ROM, for example, may be integrated into the multi-core processor system 100, or a recording medium such as a memory card, SD card, and the like.

The I/O 105, for example, may be a display, a keyboard, and the like. The display displays, for example, data such as text, images, functional information, etc., in addition to a cursor, icons, and/or tool boxes. A cathode ray tube (CRT), a thin-film-transistor (TFT) liquid crystal display, a plasma display, etc., may be employed as the display. The keyboard includes, for example, keys for inputting letters, numerals, and various instructions and performs the input of data. Alternatively, a touch-panel-type input pad or numeric keypad, etc. may be adopted.

The I/F 104 is connected, via a communication line, to a network NW, such as a local area network (LAN), a wide area network (WAN), the Internet, and the like. The I/F 104 administers an internal interface with the network NW and controls the input and output of data with respect to other apparatuses. For example, a modem or a LAN adaptor may be employed as the I/F 104.

In a first embodiment, an example is given where an app having a strong real-time constraint is assigned to a predetermined CPU for immediate execution and in the case of an app having a weak real-time constraint, one of the CPU groups is notified of an assignment instruction. This enables the load on the general master CPU to be reduced. The first embodiment gives an example where n=4, m=2, and k=4.

In the first embodiment, the real-time constraint of each app is analyzed in advance and a storage device stores an app table in which a flag that indicates the strength of the real-time constraint is entered for each app. An example of the app table is depicted in FIG. 2.

FIG. 2 is an explanatory view of an example of an app table. As depicted, an app table 200 includes fields for app IDs, app flags, and loads. Values are set into the fields whereby app information is stored as records (e.g., 201-1, 201-2).

App identification information is entered into the app ID field. A flag that indicates the strength of the real-time constraint is entered into the app flag field. For example, 0 entered in the app flag field indicates that the real-time constraint is weak, whereas 1 entered in the app flag field indicates that the real-time constraint is strong. A CPU usage amount per unit time by an app is entered into the load field. The app table 200 is stored in the shared memory 102.

FIG. 3 is an explanatory view of an example of a CPU table. As depicted, a CPU table 300 stores time information that indicates the most-recent assignment time of apps assigned to the CPUs. The CPU table 300 includes fields for CPU IDs, times, flags, and assigned apps. Values are set in the fields whereby CPU information is stored as records (e.g., 301-1, 301-2).

CPU identification information is entered into the CPU ID field. The most-recent dispatch time of an app or a thread is entered into the time field. A value is entered into the flag field that indicates whether an app with the app flag of 1 is under execution among apps currently under execution by CPUs. Entry of 1 in the flag field means an app whose real-time constraint is strong is under execution, whereas entry of 0 in the flag field means an app whose real-time constraint is not strong is under execution. The identification information of an app assigned to the CPU is set into the assigned app field. The CPU table 300 is stored in the shared memory 102.

FIG. 4 is an explanatory view of an example of dispatch-destination CPU information. As depicted, dispatch-destination CPU information 400 includes identification information of an assignment-destination CPU to which an app with a strong real-time constraint is assigned when the app is invoked. In FIG. 1, such a CPU is called a predetermined CPU. The dispatch-destination CPU information 400 is updated by an assignment-destination CPU that is entered in the dispatch-destination CPU information 400. The dispatch-destination CPU information is stored in the shared memory 102.

Figure 5:
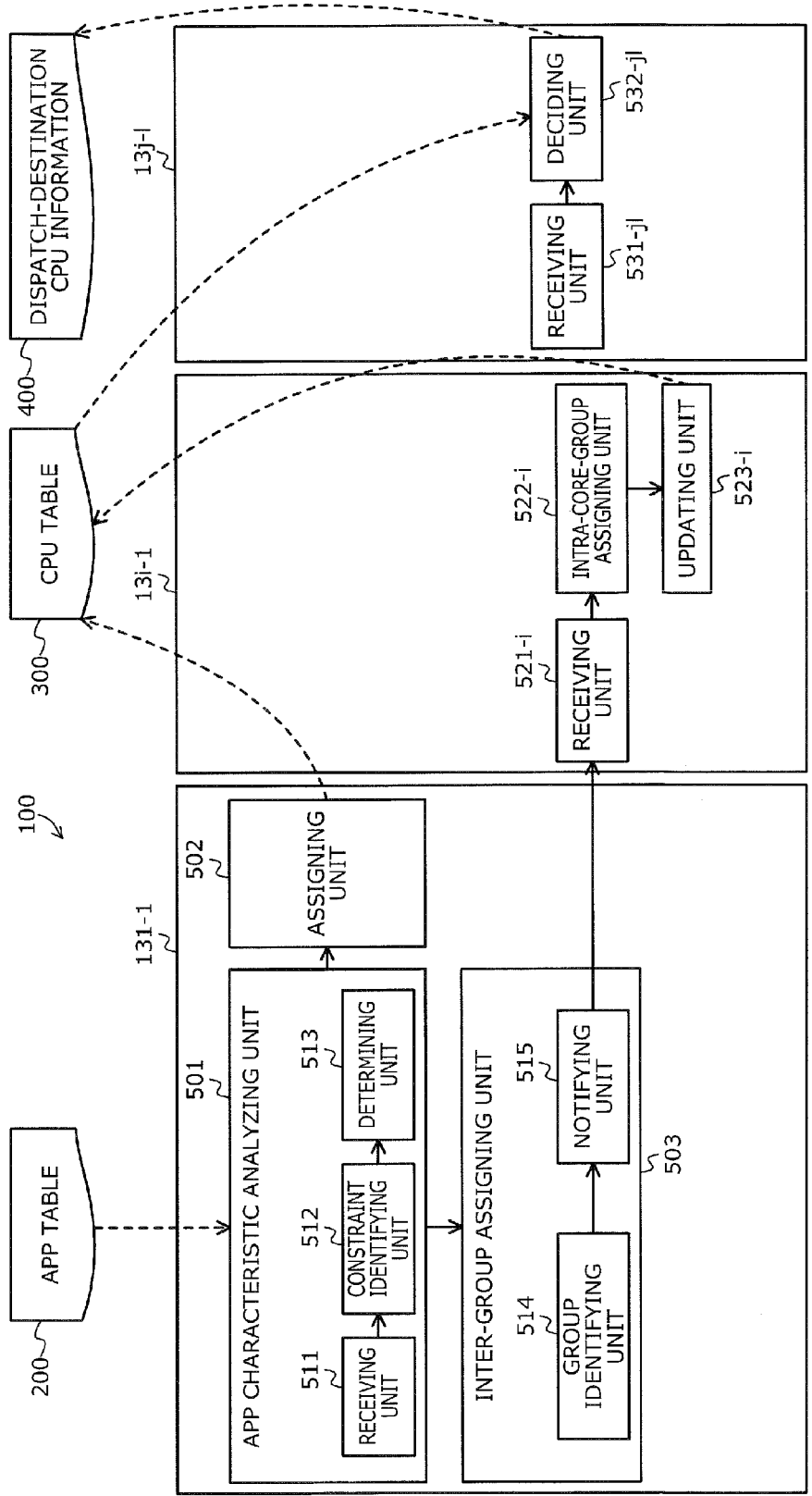
FIG. 5 is an explanatory view of an example of function blocks of a multi-core processor system 100 according to a first embodiment.

FIG. 5 is an explanatory view of an example of function blocks of the multi-core processor system 100 according to the first embodiment. The OS 131-1 acting as a general master OS includes an app characteristic analyzing unit 501, an assigning unit 502, and an inter-group assigning unit 503. For example, processes of the app characteristic analyzing unit 501 to the inter-group assigning unit 503 are coded in the OS. The CPU 111-1 reads the OS 131-1 stored in a storage device such as ROM or flash ROM, to execute the processes coded in the OS 131-1, thereby implementing the processes of the app characteristic analyzing unit 501 to the inter-group assigning unit 503.

An OS 13$i$ ($i$=1 to 4)-1 acting as a group master OS includes a receiving unit 521-$i$, an intra-core-group assigning unit 522-$i$, and an updating unit 523-$i$. For example, processes of the receiving unit 521-$i$ to the updating unit 523-$i$ are coded in the OS 13$i$-1. A CPU 11$i$-1 reads the OS 13$i$-1 stored in a storage device such as ROM or flash ROM, to execute the processes coded in the OS 13$i$-1, thereby implementing the processes of the receiving unit 521-$i$ to the updating unit 523-$i$.

An OS 13$j$ ($j$=1 to 4)-$l$ ($l$=2 to 4) acting as a slave OS includes a receiving unit 531-$jl$ and a deciding unit 532-$jl$. For example, processes of the receiving unit 531-$jl$ and the deciding unit 532-$jl$ are coded in an OS 13$j$-$l$. A CPU 11$j$-$l$ reads the OS 13$j$-$l$ stored in a storage device such as ROM or flash ROM, to execute the processes coded in the OS 13$j$-$l$, thereby implementing the processes of the receiving unit 531-$jl$ and the deciding unit 532-$jl$. Detailed examples of the units will now be described with reference to FIGS. 6 to 8.

Figure 6:
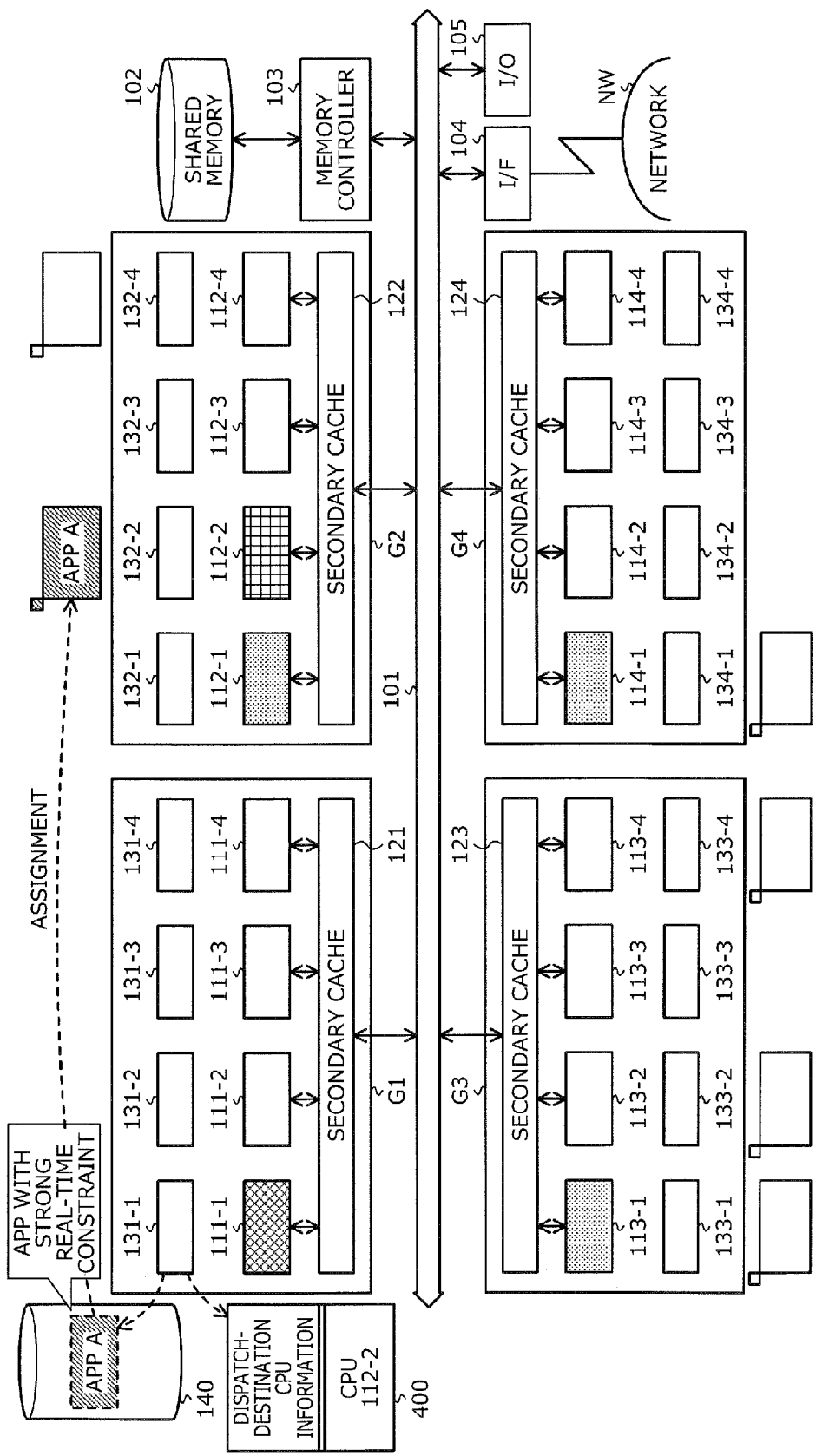
FIG. 6 is an explanatory view of an example of assignment of an app having a strong real-time constraint.

FIG. 6 is an explanatory view of an example of assignment of an app having a strong real-time constraint. The app characteristic analyzing unit 501 analyzes whether the real-time constraint of a given app instructed for invocation is strong or weak. For example, the app characteristic analyzing unit 501 includes a receiving unit 511, a constraint identifying unit 512, and a determining unit 513. The receiving unit 511 receives an instruction to invoke the given app. In the example of FIG. 6, the given app is the app A. For example, when an app is stacked into the wait queue 140, the receiving unit 511 determines that an instruction to invoke the given app has been received.

The constraint identifying unit 512 identifies app information related to the constraint of the given app. For example, the constraint identifying unit 512 identifies app information related to the given app from the app table 200 and identifies the value set in the app flag field of the identified app information. In this case, 1 is identified as a value set in the app flag field of the app information 201-1 on the app A.

The determining unit 513 then determines whether the given app is an app having a strong real-time constraint. For example, if the value set in the app flag field identified by the constraint identifying unit 512 is 1, the determining unit 513 determines the given app to be an app having a strong real-time constraint. For example, if the value set in the identified app flag field is 0, the determining unit 513 determines the given app to be an app having a weak real-time constraint.

In this case, 1 is set in the app flag field of the app information record 201-1 for the app A and thus, the app A is determined to be an app having a strong real-time constraint.

If the given app is determined as an app having a strong real-time constraint by the app characteristic analyzing unit 501, the assigning unit 502 assigns the given app to a predetermined CPU. For example, the assigning unit 502 assigns the given app to a CPU 112-2 indicated by identification information entered in the dispatch-destination CPU information 400. Furthermore, for example, the assigning unit 502 outputs the assignment result to the CPU table 300.

Figure 7:
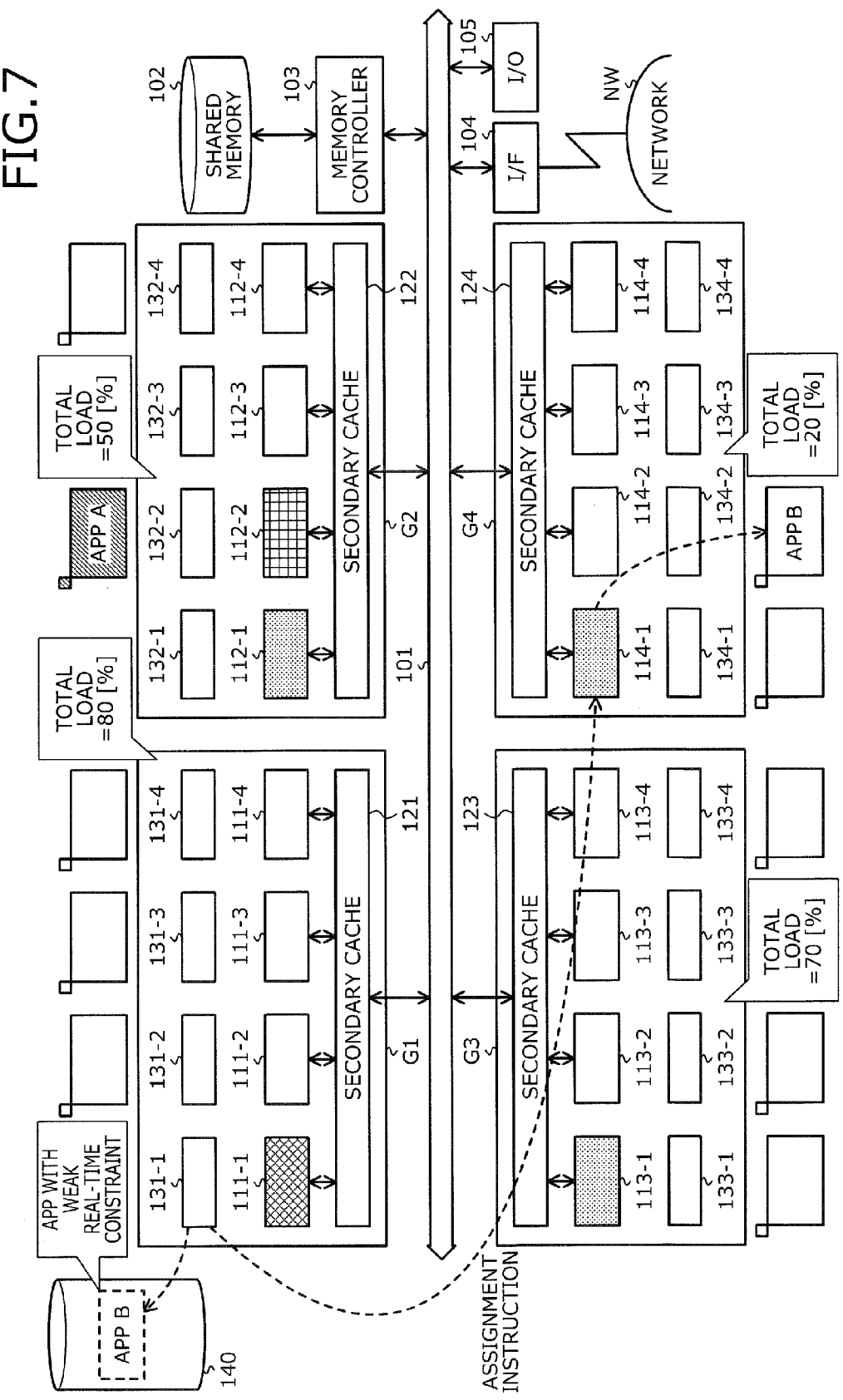
FIG. 7 is an explanatory view of an example of assignment of an app having a weak real-time constraint.

FIG. 7 is an explanatory view of an example of assignment of an app having a weak real-time constraint. In FIG. 7, the app characteristic analyzing unit 501 performs the same processing as the processing example described in FIG. 6 and therefore, detailed description thereof will not again be made. In FIG. 7, the given app is the app B. 0 is set in the app flag field of the app information record 201-2 for the app B in the app table 200. The app B is thus determined as an app having a weak real-time constraint.

If it is determined by the app characteristic analyzing unit 501 that the given app is an app having a weak real-time constraint, the inter-group assigning unit 503 notifies a group master CPU of one of the groups G1 to G4 of an instruction to assign the given app. For example, the inter-group assigning unit 503 includes a group identifying unit 514 and a notifying unit 515.

The group identifying unit 514 identifies, among the groups G1 to G4, the group having the lowest total load of apps that are under execution by CPUs belonging to the group. For example, the group identifying unit 514 may request the group master CPU of each of the groups G1 to G4 to calculate the total load of apps currently under execution by the CPUs belonging to the group G1 to G4, and acquire the results of the calculation. Alternatively, for example, the group master CPU of each group may periodically notify the general master OS (OS 131-1) of the total load of the apps currently under execution by the CPUs belonging to the group. Then, for example, the group identifying unit 514 identifies the group having the lowest total load.

In FIG. 7, the total load of the apps currently under execution by CPUs belonging to the group G1 is 80 [%]. In FIG. 7, the total load of apps currently under execution by the CPUs belonging to the group G2 is 50 [%]. In FIG. 7, the total load of apps under execution by the CPUs belonging to the group G3 is 70 [%]. In FIG. 7, the total load of apps under execution by the CPUs belonging to the group G4 is 20 [%]. The group G4 is, thus, identified as the group having the lowest total load.

The notifying unit 515 gives to the group master CPU of the group identified by the group identifying unit 514, notification of an instruction to assign the given app. For example, the notifying unit 515 issues an assignment instruction by inter-CPU communication between the CPU 111-1 and a CPU 114-1. In FIG. 7, an instruction to assign the app B is sent from the CPU 114-1 to a CPU 114-2 (i=4, k=2).

A receiving unit 521-4 receives a given app assignment instruction sent from the inter-group assigning unit 503. For example, the receiving unit 521-4 receives the assignment instruction from the general master CPU through inter-CPU communication.

When receiving the given app assignment instruction from the receiving unit 521-4, an intra-core-group assigning unit 522-4 assigns the given app to one of CPUs belonging to the group. For example, the intra-core-group assigning unit 522-4 identifies for each of CPUs belonging to the group G4, the total load of the apps under execution. Then, for example, the intra-core-group assigning unit 522-4 identifies for each of CPUs belonging to the group G4, the apps under execution. For example, by referring to the app table 200, the intra-core-group assigning unit 522-4 acquires the load of the app identified for each CPU. Then, for example, the intra-core-group assigning unit 522-4 calculates the total load for each of the CPUs and thereby, identifies the CPU having the lowest total load. Then, for example, the intra-core-group assigning unit 522-4 assigns the given app to the identified CPU.

An updating unit 523-4 updates the CPU table 300 based on the result of assignment determined by the intra-core-group assigning unit 522-4. For example, the updating unit 523-4 identifies from the CPU table 300, CPU information related to the CPU 114-2. Then, for example, the updating unit 523-4 sets the current time in the time field of the CPU information and sets identification information of the given app in the assigned app field of the CPU information.

In FIG. 7, an app is assigned to the CPU 114-1 of the group G4, but no app is assigned to the CPU 114-2 to a CPU 114-4. Therefore, the CPU 114-2 is identified as the CPU having the lowest total load and the app B is assigned to the CPU 114-2.

Figure 8:
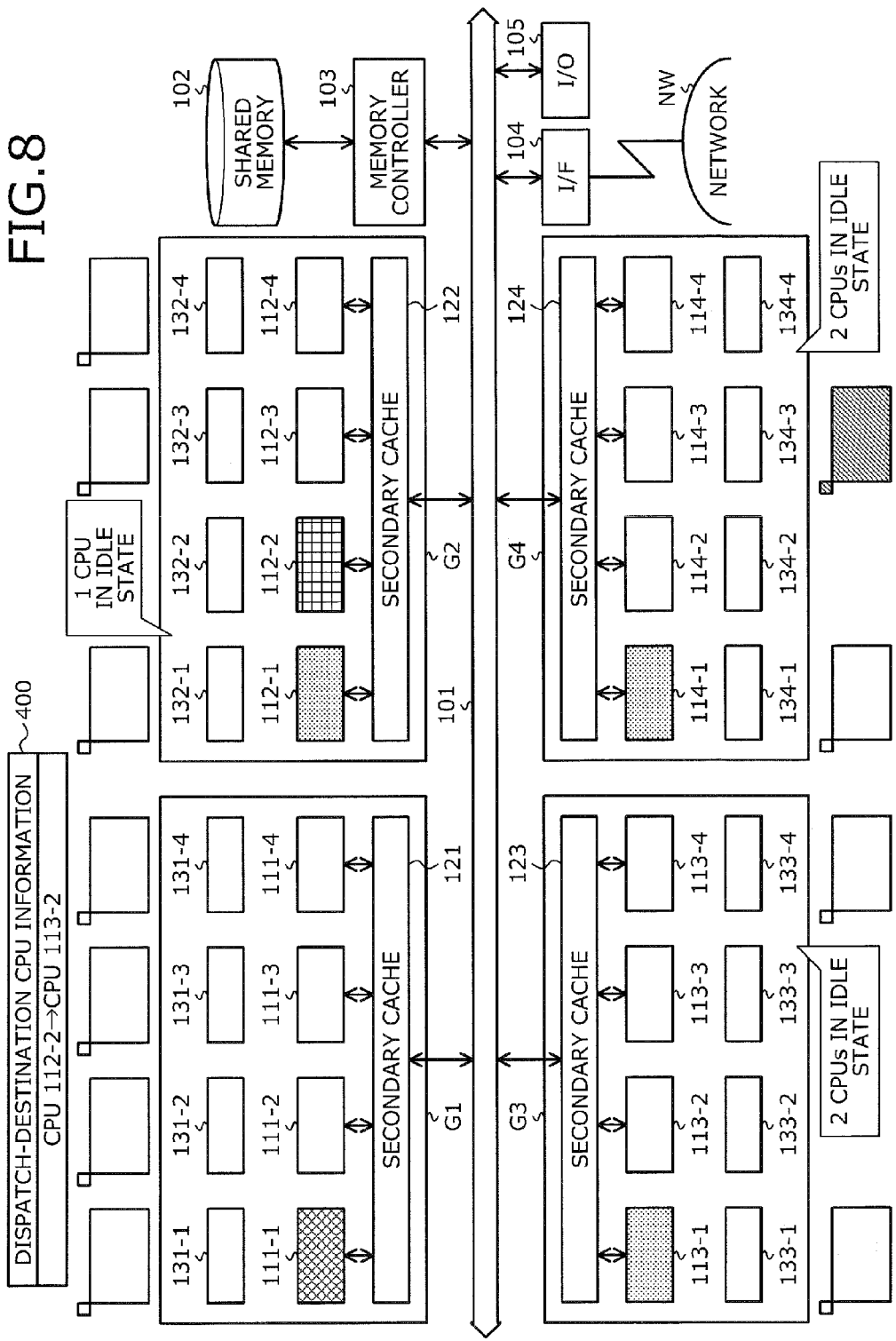
FIG. 8 is an explanatory view of an example of updating of dispatch-destination CPU information 400.

FIG. 8 is an explanatory view of an example of updating of the dispatch-destination CPU information 400. A receiving unit 531-22 of an OS 132-2 (j=2, l=2) whose identification information is set in the dispatch-destination CPU information 400 receives an instruction to update the identification information of the dispatch-destination CPU information 400. For example, when each slave OS completes the execution of an app, the update instruction is sent to the OS 132-2 whose identification information is set in the dispatch-destination CPU information 400, so that the receiving unit 531-22 is regarded as having received the update instruction.

When the receiving unit 531-22 receives the update instruction, the deciding unit 532-22 decides the assignment CPU (the predetermined CPU) for the assigning unit 502, based on whether an app is executed by each CPU. For example, the deciding unit 532-22 refers to the CPU table 300 to identify a CPU having a blank assigned app field as an idle CPU. As used herein, the idle CPU refers to a CPU to which no app is assigned.

Then, for example, for each group that includes an idle CPU, the deciding unit 532-22 identifies CPU information in the CPU table 300 on the CPUs belonging to the each group. For example, the deciding unit 532-22 determines whether the flag field is 0 of the CPU information identified for each group that includes an idle CPU. This enables the deciding unit 532-22 to determine whether among the groups having an idle CPU, there is a group that is not yet executing an app with a strong real-time constraint.

If there are groups that are not yet executing an app with a strong real-time constraint, the deciding unit 532-22 identifies, among the groups, the group that has the highest number of idle CPUs. The deciding unit 532-22 then enters identification information of an idle CPU included in the identified group into the dispatch-destination CPU information 400. As a result, the dispatch-destination CPU information 400 is updated according to the app execution status of each CPU of the multi-core processor.

In FIG. 8, the groups G2 to G4 are groups that include idle CPUs. A CPU 114-3 of the group G4 is executing an app with a strong real-time constraint, whereas the CPUs of the groups G2 and G3 are not executing apps with a strong real-time constraint. Among groups G2 and G3, since the group 3 includes more idle CPUs, an idle CPU 113-2 of the group 3 is decided as an assignment-destination CPU in the assigning unit 502. Identification information of the CPU 113-2 is newly set in the dispatch-destination CPU information 400.

Figure 9:
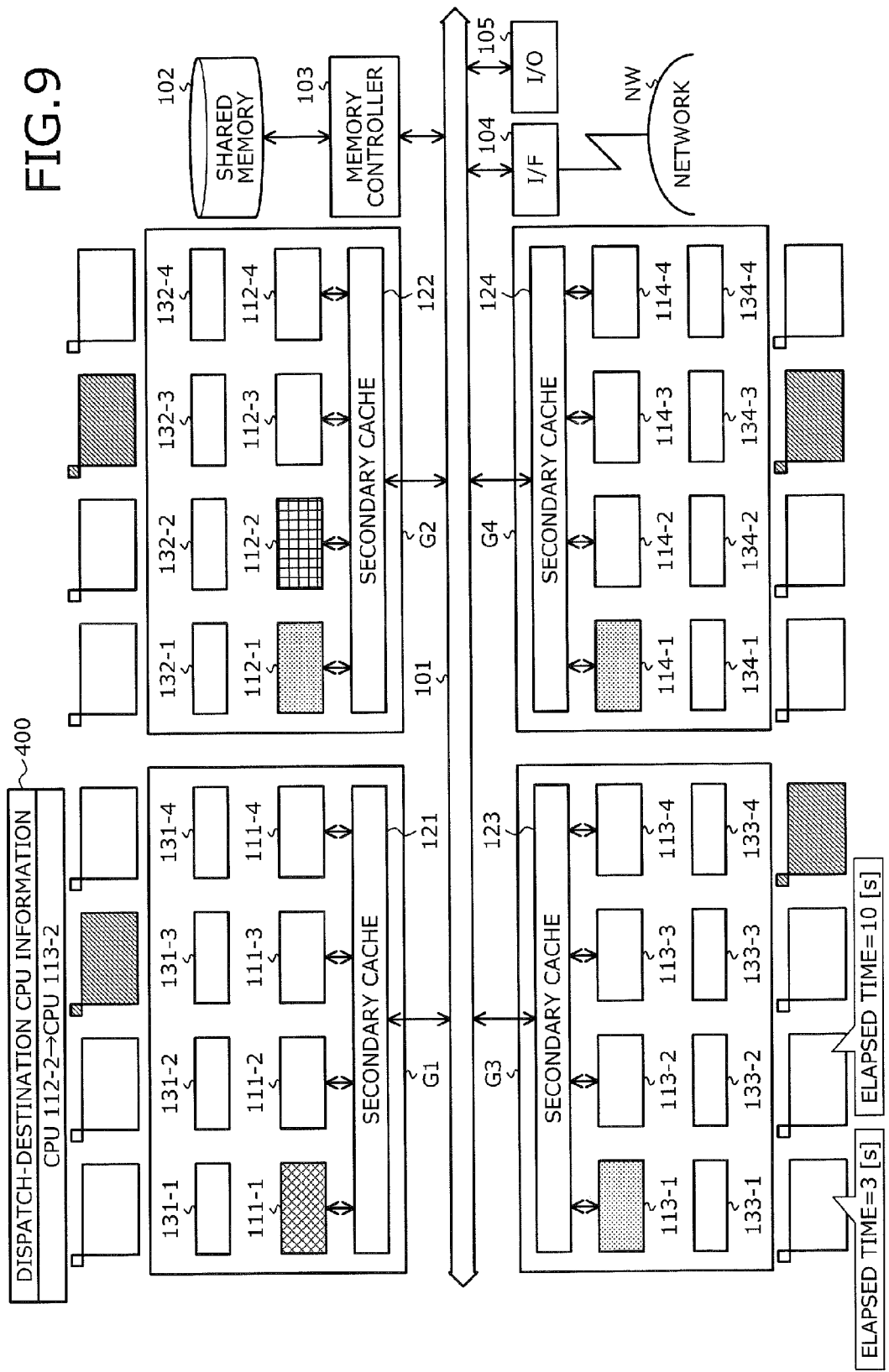
FIG. 9 is an explanatory view of another example of updating of the dispatch-destination CPU information 400.

FIG. 9 is an explanatory view of another example of updating of the dispatch-destination CPU information 400. In FIG. 9, description will be given for a case where there is no idle CPU. For example, if the deciding unit 532-22 determines that no idle CPU is present, the deciding unit 532-22 determines whether there is a group that is not yet executing an app with a strong real-time constraint.

For example, if the deciding unit 532-22 determines that there is no group not yet executing an app with a strong real-time constraint, the deciding unit 532-22 identifies a CPU having the longest elapse time after the assignment of an app. For example, concerning the longest elapsed time, the deciding unit 532-22 refers to the CPU table 300 to acquire the time set in the time field of each CPU information record. Then, for example, the deciding unit 532-22 calculates the difference of the time acquired from each CPU information record and the current time to identify the elapsed time (referred to as "elapsed time for CPU") since the assignment of the app currently under execution by each CPU. The deciding unit 532-22 sets the identification information of the CPU identified to have the longest elapsed time into the dispatch-destination CPU information 400.

In FIG. 9, for example, the elapsed time for CPU 133-1 is 3 [s] and the elapsed time for CPU 133-2 is 10 [s]. Then, for example, if the elapsed time for CPU 133-2 is determined to be the longest, the identification information of the CPU 133-2 is newly entered into the dispatch-destination CPU information 400. Here, the general master CPU and the group master CPUs are preliminarily excluded as CPUs whose identification information may be entered into the dispatch-destination CPU information 400, thereby enabling the loads of the general master CPU and the group mater CPUs to be reduced.

Figure 10:
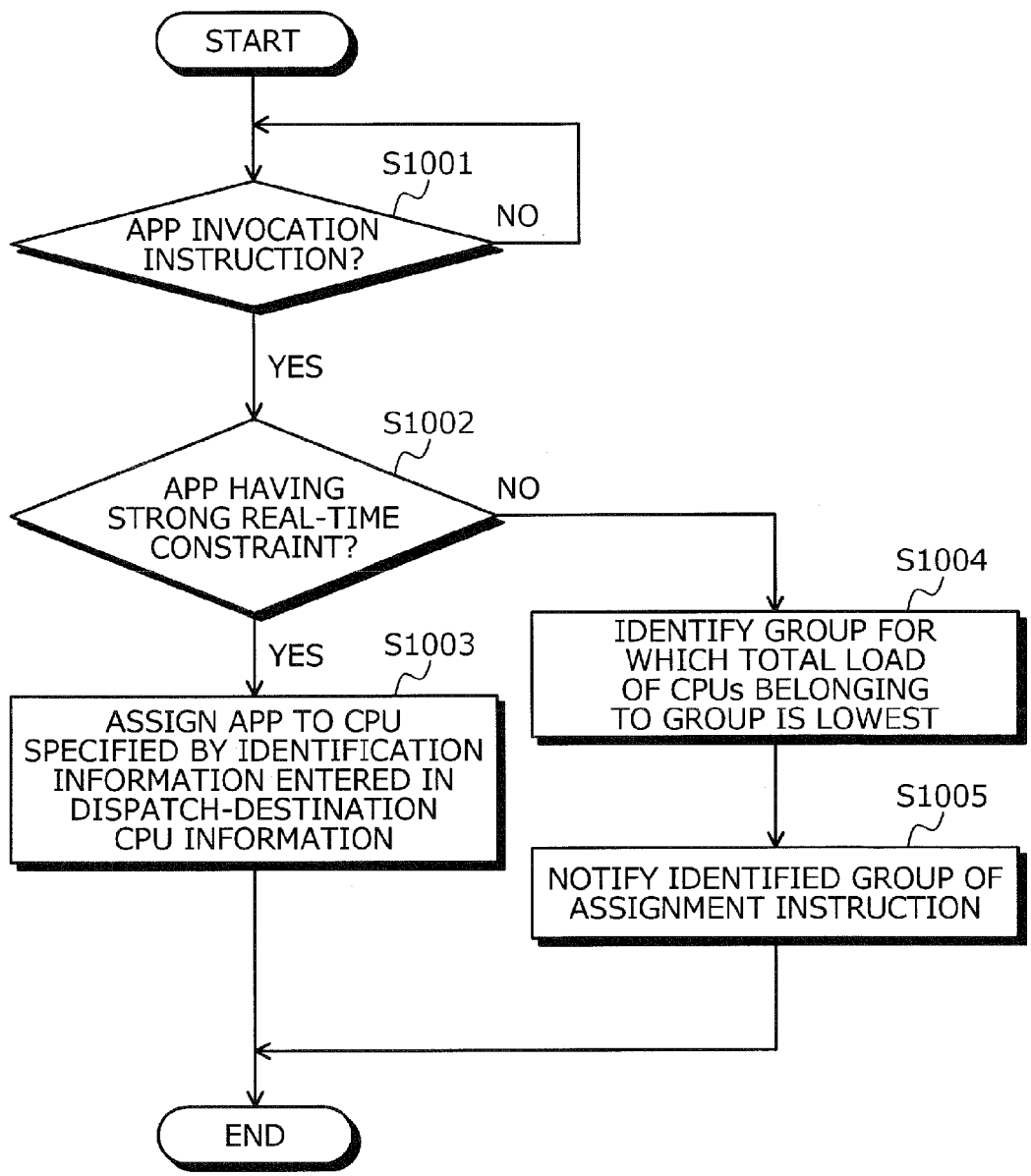
FIG. 10 is a flowchart of an example of a process procedure performed by a general master CPU.

FIG. 10 is a flowchart of an example of a process procedure performed by the general master CPU. First, the general mater CPU determines whether an app invocation instruction has been received (step S1001) and if no app invocation instruction has been received (step S1001: NO), returns to step S1001.

If an app invocation instruction has been received (step S1001: YES), the general master CPU determines whether the app for which the invocation instruction has been received is an app having a strong real-time constraint (step S1002). If the app is determined to be an app having a strong real-time constraint (step S1002: YES), the general master CPU assigns the app to the CPU specified by identification information entered in the dispatch-destination CPU information 400 (step S1003), to end the series of operations.

At step S1002, if the app is determined not to be an app having a strong real-time constraint (step S1002: NO), the general master CPU identifies, among plural groups, the group for which the total load of CPUs belonging to the group is lowest (step S1004). The general master CPU then notifies the identified group of an assignment instruction (step S1005) to end the series of operations.

Figure 11:
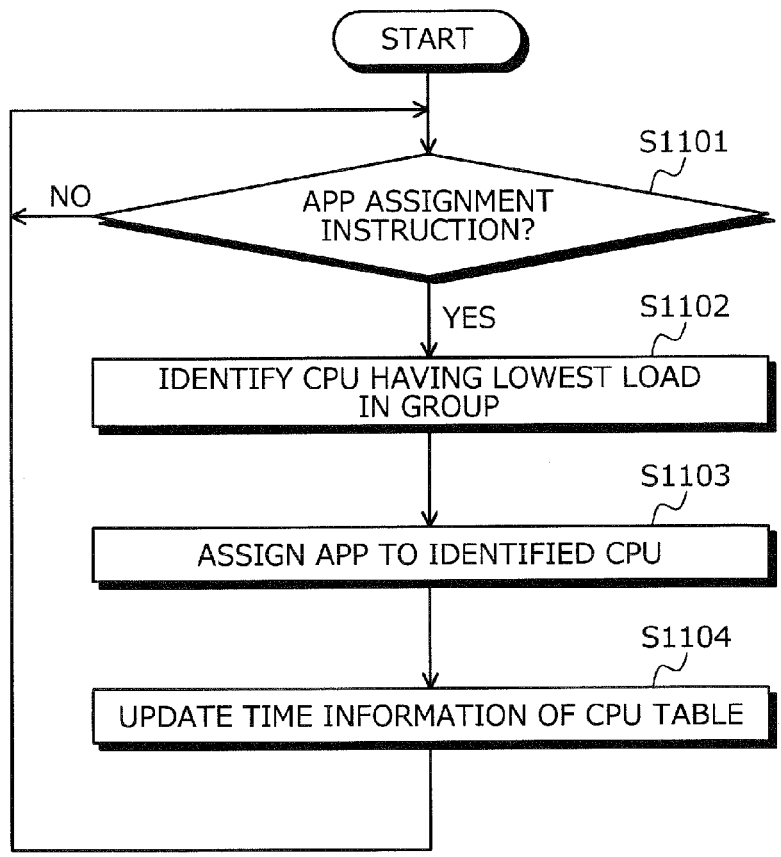
FIG. 11 is a flowchart of an example of a process procedure performed by a group master CPU according to the first embodiment.

FIG. 11 is a flowchart of an example of a process procedure performed by the group master CPU according to the first embodiment. First, the group mater CPU determines whether an app assignment instruction has been received (step S1101). If no app assignment instruction has been received (step S1101: NO), the group master CPU returns to step S1101.

If an app invocation instruction has been received (step S1101: YES), the group master CPU identifies the CPU having the lowest load in the group (step S1102). The group master CPU assigns the app to the identified CPU (step S1103) and updates the time information of the CPU table 300 for the identified CPU (step S1104), and returns to step S1101.

Figure 12:
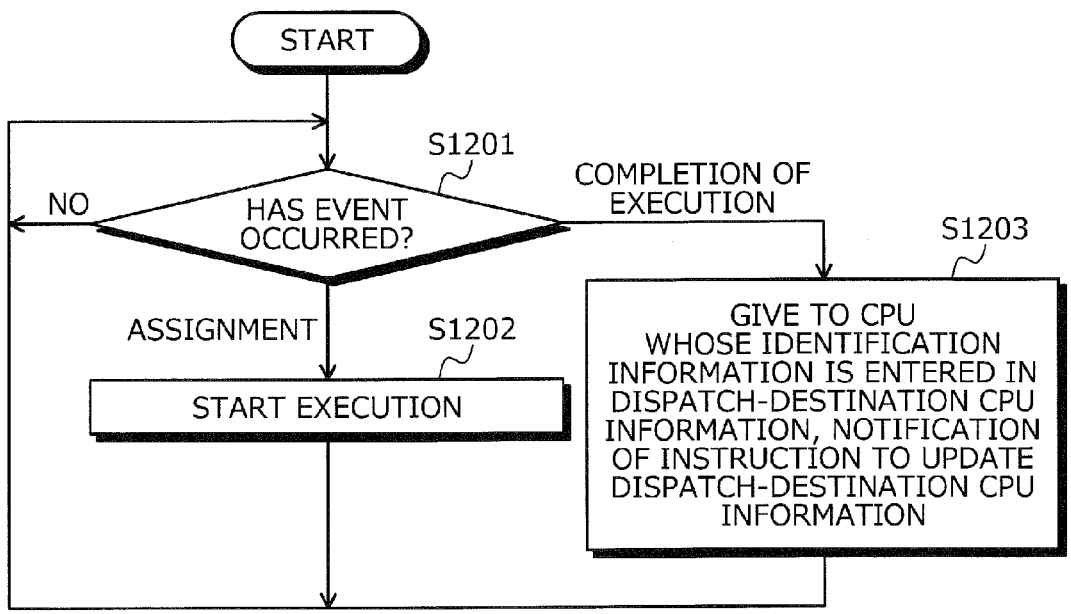
FIG. 12 is a flowchart of an example of a process procedure performed by CPUs according to the first embodiment.

FIG. 12 is a flowchart of an example of a process procedure performed by CPUs according to the first embodiment. First, a CPU determines whether an event has occurred (step S1201). If no event has occurred (step S1201: NO), the CPU returns to step S1201.

If the CPU has received an app assignment (step S1201: Assignment), the CPU starts the execution of the assigned app (step S1202) and returns to step S1201. If the execution of an app has been completed (step S1201: Completion of Execution), the CPU gives to the CPU whose identification information is entered in the dispatch-destination CPU information 400, notification of an instruction to update the dispatch-destination CPU information 400 (step S1203), and returns to step S1201.

For example, by preliminarily excluding the general master CPU and the group mater CPUs from being set as the dispatch-destination CPU information 400, the general master CPU and the group master CPUs need not perform the processes depicted in the flowcharts, thereby enabling the loads of the general master CPU and the group master CPUs to be reduced.

Figure 13:
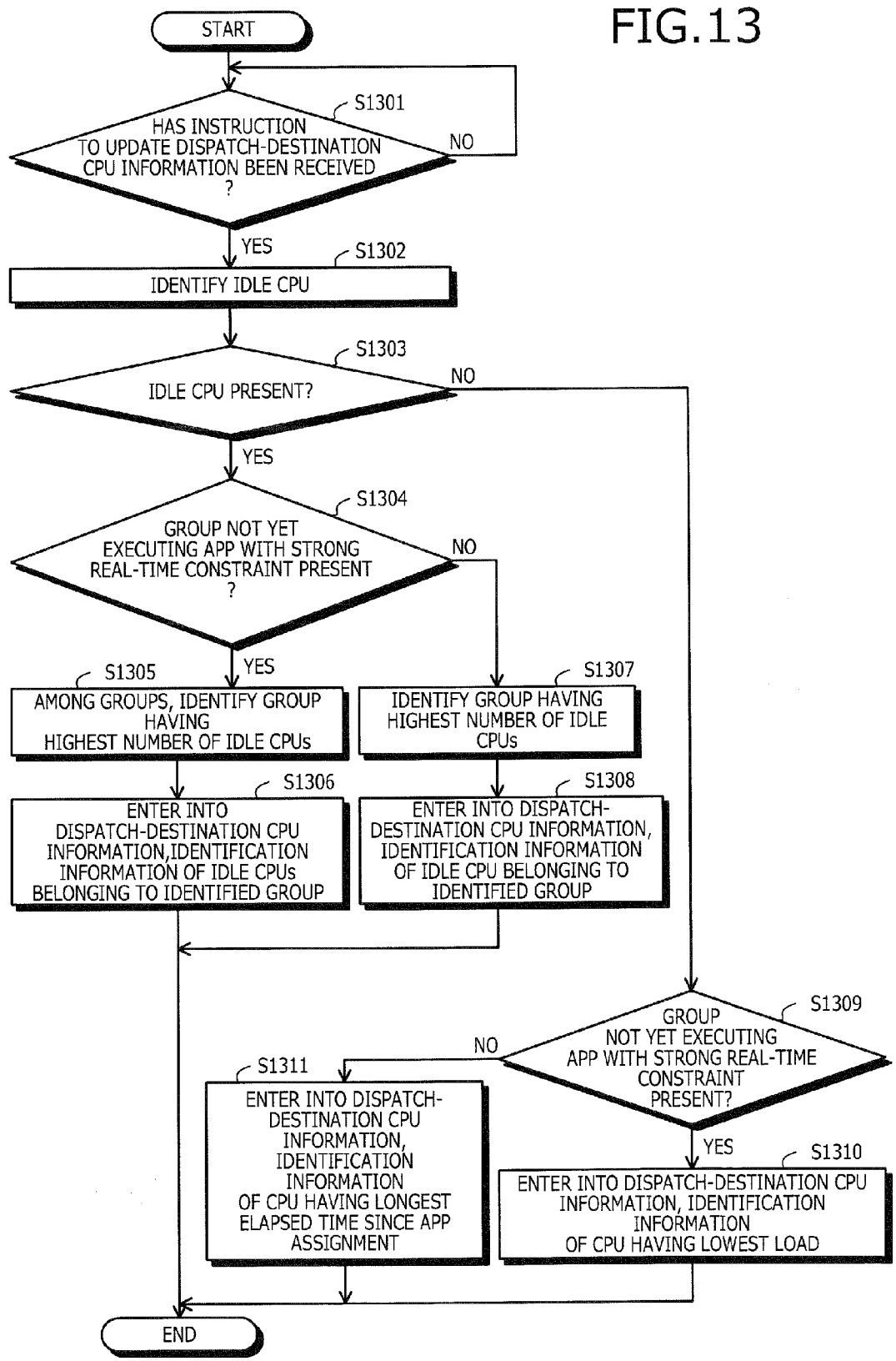
FIG. 13 is a flowchart of an example of a process procedure performed by slave CPUs according to the first embodiment.

FIG. 13 is a flowchart of an example of a process procedure performed by slave CPUs according to the first embodiment. A slave CPU determines whether an instruction to update the dispatch-destination CPU information 400 has been received (step S1301).

If the slave CPU determines that no instruction to update the dispatch-destination CPU information 400 has been received (step S1301: NO), the slave CPU returns to step S1301. If the slave CPU determines that an instruction to update the dispatch-destination CPU information 400 has been received (step S1301: YES), the slave CPU identifies an idle CPU (step S1302).

The slave CPU then determines whether an idle CPU is present (step S1303) and if an idle CPU is present (step S1303: YES), the slave CPU transitions to step S1304. The slave CPU then determines whether among the groups having an idle CPU, there is a group not yet executing an app with a strong real-time constraint (step S1304).

If the slave CPU determines that there is a group not yet executing an app with a strong real-time constraint (step S1304: YES), the slave CPU identifies the group having the highest number of idle CPUs among groups not yet executing an app with a strong real-time constraint (step S1305). The slave CPU then enters into the dispatch-destination CPU information 400, the identification information of idle CPUs among CPUs belonging to the identified group (step S1306), to end the series of operations.

At step S1304, if the slave CPU determines that there is no group not yet executing an app with a strong real-time constraint (step S1304: NO), the slave CPU identifies the group having the highest number of idle CPUs (step S1307). The slave CPU enters into the dispatch-destination CPU information 400, the identification information of any one of the idle CPUs belonging to the identified group (step S1308), to end the series of operations.

At step S1303, if the slave CPU determines that no idle CPU is present (step S1303: NO), the slave CPU determines whether there is a group not yet executing an app with a strong real-time constraint (step S1309).

If the slave CPU determines that there is a group not yet executing an app with a strong real-time constraint (step S1309: YES), the slave CPU goes to step S1310. The slave CPU enters into the dispatch-destination CPU information 400, the identification information of the CPU having the lowest load among CPUs not yet executing a strong real-time constraint (step S1310), to end the series of operations.

At step S1309, if the slave CPU determines that there is no group not yet executing an app with a strong real-time constraint (step S1309: NO), the slave CPU transitions to step S1311. The slave CPU enters into the dispatch-destination CPU information 400, the identification information of the CPU having the longest elapsed time since the assignment of an app (step S1311), to end the series of operations.

In a second embodiment, an example is given where, when an given app having a strong real-time constraint is assigned, control is provided so as not to degrade the performance of the CPU to which the given app is assigned, in order to prevent the real-time constraint from being violated at the time of execution of the given app.

For example, if the groups G1 to G4 each include the secondary caches 121 to 124, when plural CPUs in the same group access the secondary caches 121 to 124 at one time, the performance of the CPUs may drop consequent to the occurrence of access contention. Thus, when a given app having a strong real-time constraint is assigned, the second embodiment prevents CPUs other than a given app assignment-destination CPU of the group to which the assignment-destination CPU belongs from using the secondary cache used by the assignment-destination CPU. This can prevent drops in the performance of the given app assignment-destination CPU and prevent the violation of the real-time constraint at the time of execution of the given app.

If plural CPUs access the shared memory 102 at one time, the performance of the CPUs may drop consequent to the occurrence of access contention. Thus, when a given app having a strong real-time constraint is assigned, the second embodiment sets the rate of access of the shared memory 102 by the given app assignment-destination CPU to be higher than before the assignment. This can prevent drops in the performance of the given app assignment-destination CPU and prevent violation of the real-time constraint at the time of execution of the given app.

In the second embodiment, the same processes, units, and tables as those described in the first embodiment are designated by the same reference numerals used in the first embodiment and will not again be described. With reference to FIGS. 14 and 15, description will be given of a CPU table and cache mode setting information that are newly used in the second embodiment.

FIG. 14 is an explanatory view of an example of a CPU table used in the second embodiment. As depicted, a CPU table 1400 stores time information that indicates the most-recent assignment time of apps assigned to the CPUs. The CPU table 1400 includes fields for CPU IDs, times, flags, assigned apps, and a bus priority. Values are set in the fields whereby CPU information is stored as records (e.g., 1401-1, 1401-2).

CPU identification information is entered into the CPU ID field. The most-recent app assignment time is entered into the time field. A value is entered into the flag field that indicates whether an app with the app flag of 1 is under execution among apps currently under execution by CPUs. Entry of 1 in the flag field means an app whose real-time constraint is strong is under execution, whereas entry of 0 in the flag field means an app whose real-time constraint is not strong is under execution. Identification information of an app assigned to a CPU is set into the assigned app field. The bus priority of the CPU is entered in the bus priority field. The bus priority for a CPU that is executing an app having a strong real-time constraint is set to be greater than that for an app having a weak real-time constraint. The CPU table 1400 is stored in the shared memory 102.

FIG. 15 is an explanatory view of an example of cache mode setting information. Although cache mode setting information 1500 is provided for each of the secondary caches 121 to 124, an example will be described in FIG. 15 where the cache mode setting information 1500 is used for the secondary cache 122 of the group G2.

The cache mode setting information 1500 is information that indicates whether CPUs 112-1 to 112-4 that share the secondary cache 122 use the secondary cache 122. The cache mode setting information 1500 includes fields for CPU IDs and cache modes. Information is set in each of the fields whereby the information is stored as records (e.g., 1501-1 to 1501-4).

Identification information of the CPUs 112-1 to 112-4 that share the secondary cache 122 is entered in the CPU ID field. Either "non-cache" or "cache" is set in the cache mode field. "Non-cache" set in the cache mode field means that the CPU 112-$x$ ($x=1$ to 4) does not use the secondary cache 122. "Cache" set in the cache mode field means that the CPU 112-$x$ ($x=1$ to 4) uses the secondary cache 122. The default setting of the cache mode field is "cache" so that any CPU 112-$x$ ($x=1$ to 4) sharing the secondary cache 122 can change the setting in the cache mode field of the cache mode setting information 1500.

For example, the cache controller of the secondary cache 122 is assumed to have the cache mode setting information 1500. The cache controller of the secondary cache 122 allows cache memory of the secondary cache 122 to store data along the cache mode setting information 1500.

Figure 16:
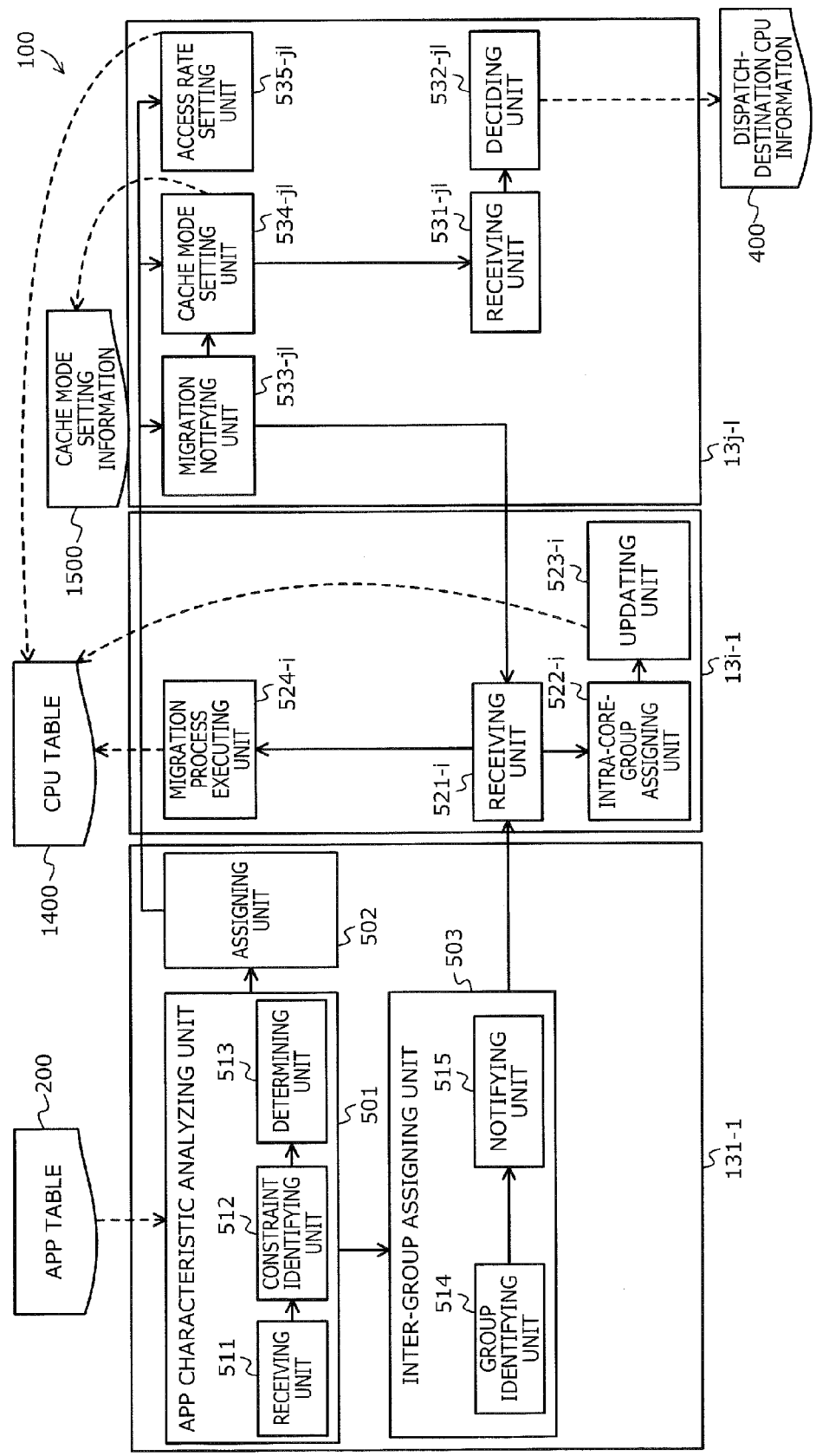
FIG. 16 is an explanatory view of an example of functional blocks of the multi-core processor system 100 according to the second embodiment.

FIG. 16 is an explanatory view of an example of functional blocks of the multi-core processor system 100 according to the second embodiment. The OS 131-1 acting as the general master OS depicted in FIG. 16 is the same as in the example of FIG. 5 and therefore, will not again be described.

The OS 13$i$-1 acting as the group master OS includes the receiving unit 521-$i$, the intra-core-group assigning unit 522-$i$, the updating unit 523-$i$, and a migration process executing unit 524-$i$. For example, processes of the receiving unit 521-$i$ to the migration process executing unit 524-$i$ are coded in the OS 13$i$-1. The CPU 11$i$-1 reads the OS 13$i$-1 stored in a storage device such as the ROM or the flash ROM, to execute the processes coded in the OS 13$i$-1, thereby implementing the processes of the receiving unit 521-$i$ to the migration process executing unit 524-$i$. The processing of the intra-core-group assigning unit 522-$i$ is the same as that described in the first embodiment and therefore will not again be described in detail.

The OS 13$j$-$l$ acting as the slave OS includes the receiving unit 531-$jl$, the deciding unit 532-$jl$, a migration notifying unit 533-$jl$, a cache mode setting unit 534-$jl$, and an access rate setting unit 535-$jl$. For example, processes of the receiving unit 531-$jl$ to the access rate setting unit 535-$jl$ are coded in the OS 13$j$-$l$. The CPU 11$j$-$l$ reads the OS 13$j$-$l$ stored in a storage device such as the ROM or the flash ROM, to execute the processes coded in the OS 13j-l, thereby implementing the processes of the receiving unit 531-jl to the access rate setting unit 535-jl. Processes of the receiving unit 531-jl and the deciding unit 532-jl are the same as those described in the first embodiment and hence will not again be described in detail.

For example, as in FIG. 6, the app A is assumed to be an app having a strong real-time constraint and the assigning unit 502 is assumed to assign the app A to the CPU 112-2 (j=2, l=2).

When receiving the given app assignment from the assigning unit 502, a cache mode setting unit 534-22 performs setting so that the other CPUs belonging to the same group G2 do not access the secondary cache 122. For example, through inter-CPU communication, the cache mode setting unit 534-22 notifies the other CPUs 112-1, 112-3, 112-4 belonging to the same group G2 of a change instruction to change the cache mode to the non-cache mode.

When the receiving unit 531-22 receives a change instruction to change to the non-cache mode issued through inter-CPU communication, the cache mode setting unit 534-22 saves data that is on the secondary cache 122 into the shared memory 102. The cache mode setting unit 534-22 then changes the cache mode of the CPU 112-2. For example, the cache mode setting unit 534-22 identifies data that is related to apps under execution and stored in the secondary cache 122, based on logical addresses of the data. For example, the cache mode setting unit 534-22 then fetches the identified data from the secondary cache 122. The cache mode setting unit 534-22 accesses the cache mode setting information 1500 identifies use information related to the CPU 112-2. The cache mode setting unit 534-22 then sets non-cache into the cache mode field of the identified use information.

FIG. 17 is an explanatory view of an example of the cache mode setting information 1500 after setting. Since, for example, the app A is assigned to the CPU 112-2, the cache mode fields of the use information related to the CPUs 112-1, 112-3, and 112-4 are set into non-cache. The cache controller of the secondary cache 122 detects a change in the cache mode setting information 1500 and controls whether data is to be stored in the cache memory of the secondary cache, based on the cache mode setting information 1500.

Returning to the description of FIG. 16, when a migration notifying unit 533-22 receives the given app assignment from the assigning unit 502, the migration notifying unit 533-22 notifies the CPU 112-1 acting as the group master CPU of a migration instruction to migrate all apps under execution to the other CPUs of the same group. For example, via inter-CPU communication, the migration notifying unit 533-22 notifies the group master CPU of a migration instruction that includes migration-source CPU information.

When a receiving unit 521-2 receives the migration instruction, a migration process executing unit 524-2 executes a migration process for moving all of apps under execution and execution standby apps at the migration instruction notification-source CPU to the other CPUs in the group G2. For example, the receiving unit 521-2 receives the migration instruction issued from the CPU through the inter CPU communication. For example, the migration process executing unit 524-2 writes data included in the primary cache of the migration-source CPU into the shared memory 102. For example, the migration process executing unit 524-2 notifies a migration-destination CPU of a pointer of context information of an app to be migrated. This allows a given app having a strong real-time constraint to be executed without conflicting with the execution of other apps.

When an access rate setting unit 535-22 receives the given app assignment from the assigning unit 502, the access rate setting unit 535-22 sets the rate of access of the shared memory 102 by the CPU 112-2 to be higher than the access rate before the assignment of the given app. For example, the default value of the access rate is assumed to be 1 and the value of the access rate of the CPU executing an app having a strong real-time constraint is assumed to be 10. In this case, the access rate setting unit 535-22 notifies the memory controller 103 of a change instruction to set the access rate of the CPU 112-2 to 10. The change instruction includes, for example, identification information of the CPU 112-2 and the value of the access rate after the change.

Furthermore, for example, the access rate setting unit 535-22 refers to the CPU table 300 to identify the CPU information of the CPU 112-2. For example, the access rate setting unit 535-22 then sets the value of the bus priority field of the identified CPU information to 10.

Figure 18:
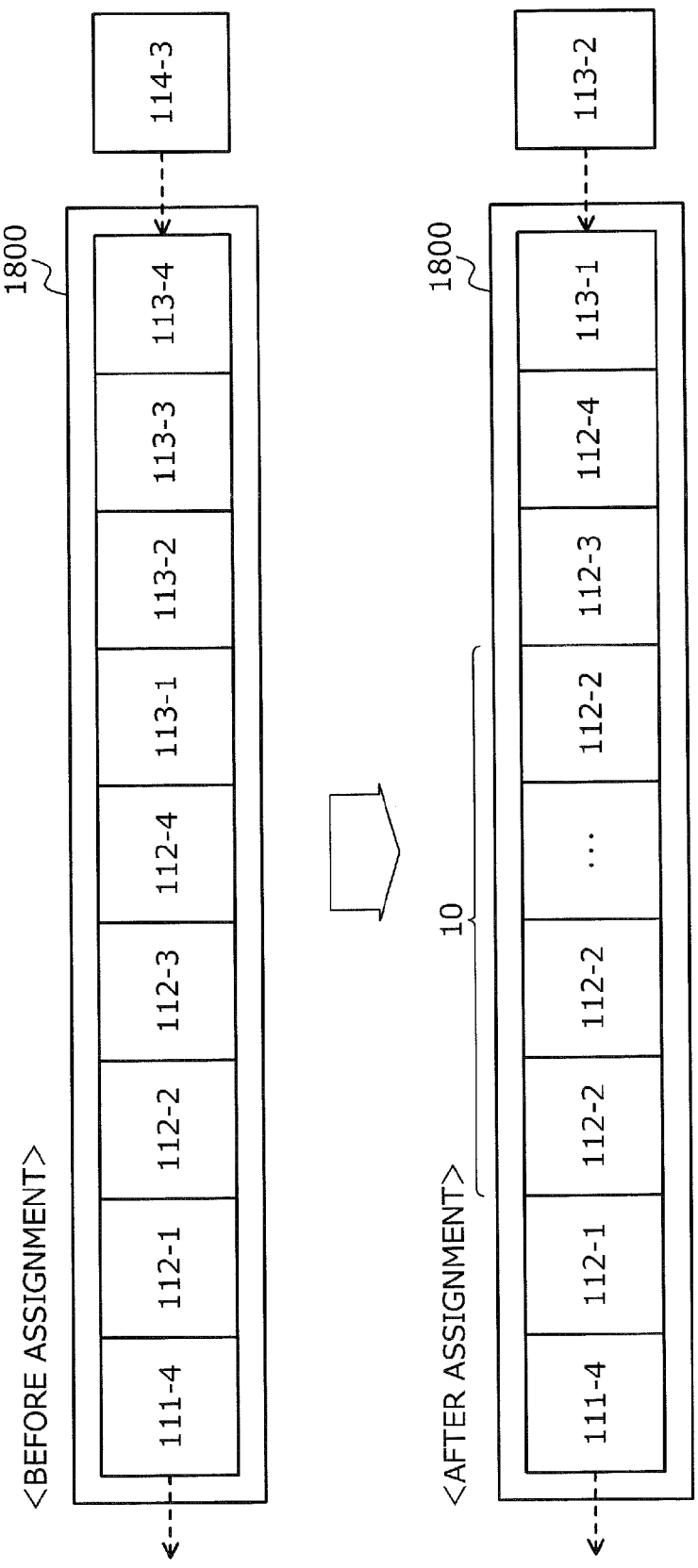
FIG. 18 is an explanatory view of an example of increasing an access rate.

FIG. 18 is an explanatory view of an example of increasing the access rate. The memory controller 103 controls access by each CPU in time slice in order of access request entered in a request queue 1800. In this case, assume for example that the memory controller 103 includes registers corresponding to the CPUs so that the access rates of the CPUs are set in the corresponding registers. The memory controller 103 then controls the entry of the request from the CPUs into the request queue 1800 based on the values of the registers corresponding to the CPUs.

When the memory controller 103 receives an instruction to change the access rate by the CPUs, the memory controller 103 changes the value of the register for the CPU to the access rate included in the change instruction, based on the CPU identification information included in the change instruction. Boxes in the request queue 1800 are access requests. The memory controller 103 receives the access request from the right end of the request queue 1800 and processes the access request in sequence from the left end thereof. For example, among the boxes of the request queue 1800, boxes designated at reference numerals of CPUs are access requests from the corresponding CPUs.

Before the assignment of a given app, the access rates are each 1. Consequently, the access requests from the CPUs are entered one by one into the request queue 1800. After the assignment of the given app, the access rate from the CPU 112-2 becomes higher, with the result that 10 consecutive boxes designated at 112-2 are present among the boxes of the request queue 1800.

Figure 19:
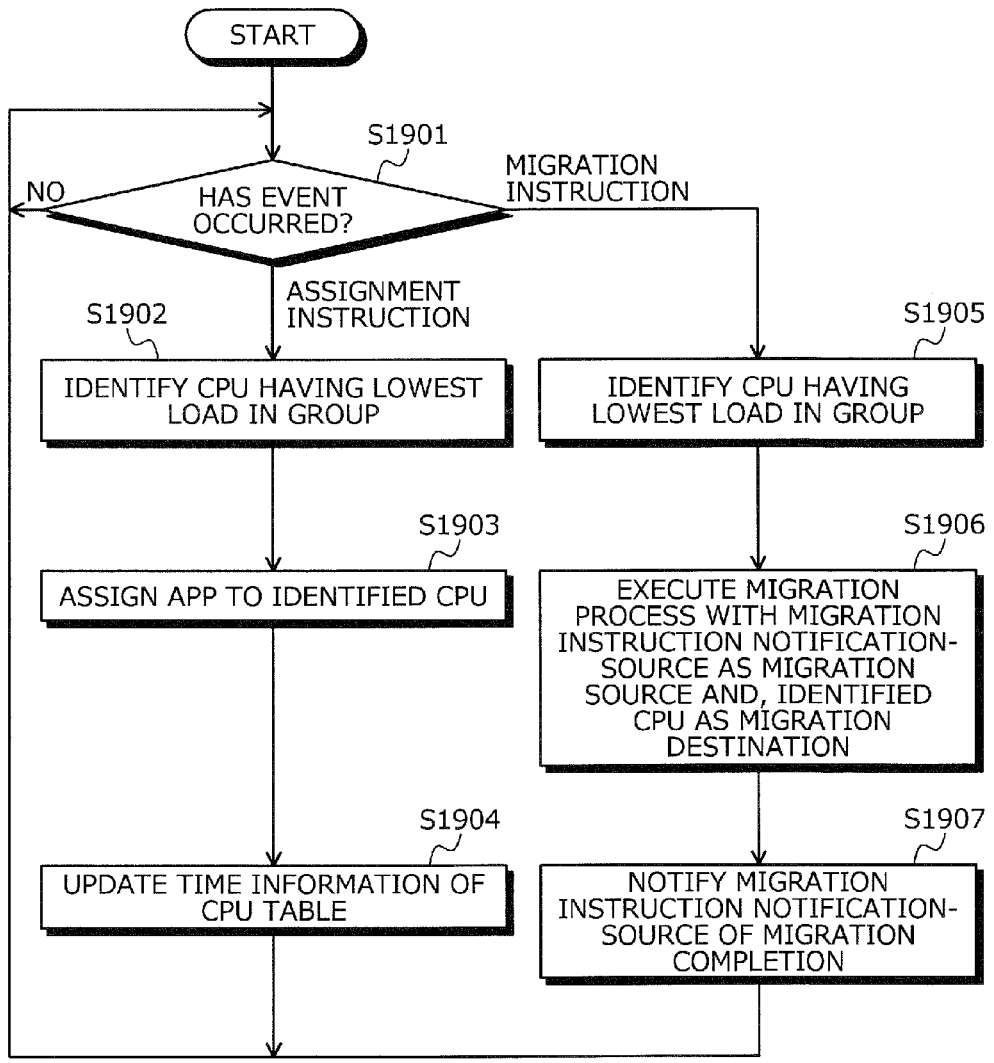
FIG. 19 is a flowchart of an example of a process procedure performed by the group master CPU according to the second embodiment.

FIG. 19 is a flowchart of an example of a process procedure performed by the group master CPU according to the second embodiment. First, the group master CPU determines whether an event has occurred (step S1901). If the group master CPU determines that no event has occurred (step S1901: NO), the group master CPU returns to step S1901.

If an app assignment instruction has been received (step S1901: Assignment instruction), the group master CPU identifies the CPU having the lowest load in the group (step S1902). The group master CPU assigns the app to the identified CPU (step S1903) and updates the time information of the CPU table 300 for the identified CPU (step S1904), and returns to step S1901. Here, the time information represents a value of the time field in the CPU table.

If the group master CPU determines that a migration instruction has been received (step S1901: Migration instruction), the group master CPU identifies the CPU having the lowest load in the group (step S1905). The group master CPU then executes the migration process with a migration instruction notification-source as the migration source and with the identified CPU as the migration destination (step S1906). The group master CPU notifies the migration instruction notification-source of the completion of migration (step S1907), and returns to step S1901.

Figure 20:
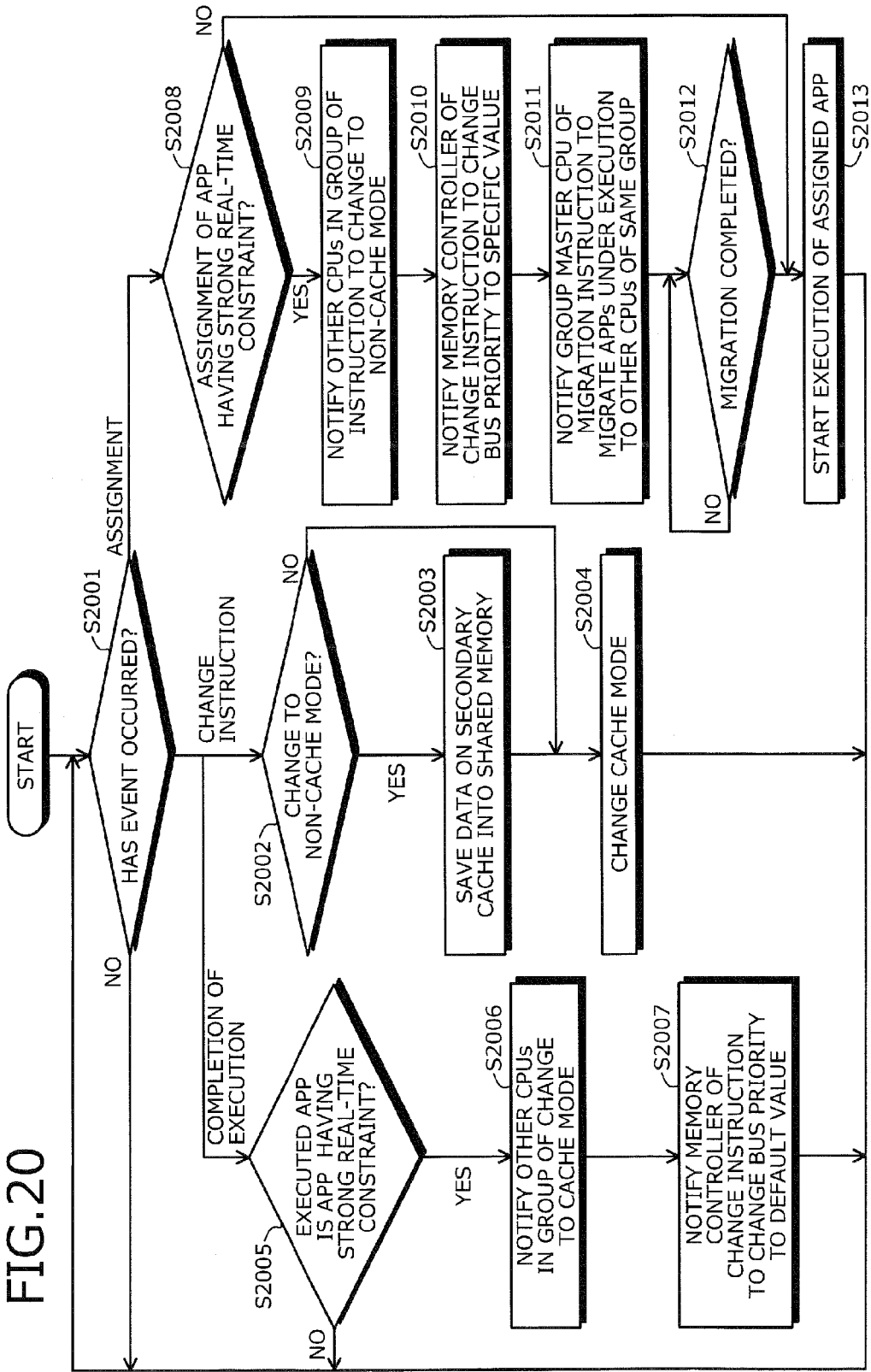
FIG. 20 is a flowchart of an example of a process procedure performed by a slave CPU according to the second embodiment.

FIG. 20 is a flowchart of an example of a process procedure performed by a slave CPU according to the second embodiment. First, the slave CPU determines whether an event has occurred (step S2001). If no event has occurred (step S2001: NO), the slave CPU returns to step S2001.

If the slave CPU determines that a cache mode change instruction has been received (step S2001: Change instruction), the slave CPU determines whether the change is a change to non-cache mode (step S2002). If the slave CPU determines that the change is a change to non-cache mode (step S2002: YES), the slave CPU saves data that is on the secondary cache into the shared memory 102 (step S2003).

The slave CPU then changes the cache mode (step S2004) and returns to step S2001. At step S2002, if the slave CPU determines that the change is not a change to non-cache mode (step S2002: NO), the slave CPU transitions to the step S2004.

If the slave CPU determines that notification of the completion of the execution of an app has been received (step S2001: Completion of execution), the slave CPU determines whether the app whose execution has been completed is an app having a strong real-time constraint (step S2005). If the slave CPU determines that the app whose execution has been completed is not an app having a strong real-time constraint (step S2005: NO), the slave CPU returns to step S2001.

If the slave CPU determines that the app whose execution has been completed is an app having a strong real-time constraint (S2005: YES), the slave CPU notifies the other CPUs in the group of a change to cache mode (step S2006). The slave CPU notifies the memory controller 103 of a change instruction to change the bus priority to the default value (step S2007) and returns to step S2001.

At step 2001, if the slave CPU determines that an app assignment has been received (step S2001: Assignment), the slave CPU determines whether the assignment is an assignment of an app having a strong real-time constraint (step S2008). If the slave CPU determines that the assignment is not an assignment of an app having a strong real-time constraint (step S2008: NO), the slave CPU transitions to step S2013.

If the slave CPU determines that the assignment is an assignment of an app having a strong real-time constraint (step S2008: YES), the slave CPU notifies the other CPUs in the group of an instruction to change to the non-cache mode (step S2009). The slave CPU then notifies the memory controller 103 of a change instruction to change the bus priority to a specific value (step S2010) and notifies the group master CPU of a migration instruction to migrate apps under execution to the other CPUs of the same group (step S2011).

The slave CPU then determines whether the migration has been completed (step S2102). For example, consequent to notification of migration completion from the group master CPU, the slave CPU determines whether the migration has been completed, based on whether the migration completion notification has been received.

If the slave CPU determines that the migration has not been completed (step S2012: NO), the slave CPU returns to step S2012. If the slave CPU determines that the migration has been completed (step S2012: YES), the slave CPU starts to execute the assigned app (step S2013) and returns to step S2001.

FIG. 21 is a diagram of an example of application of the multi-core processor system 100 depicted in FIG. 1. In FIG. 21, the network NW is a network NW where servers 2101 and 2102 are communicable with clients 2131 to 2134 and is for example a local area network (LAN), a wide area network (WAN), Internet, a mobile phone network, or the like.

The server 2102 is a management server of a server group (servers 2121 to 2125) making up a cloud 2120. Among the clients 2131 to 2134, the client 2131 is a notebook PC, the client 2132 is a desktop PC, the client 2133 is a mobile phone (or may be a smartphone or a personal handyphone system (PHS)), and the client 2134 is a tablet terminal. The servers 2101, 2102, 2121 to 2125 and the clients 2131 to 2134 of FIG. 21 are implemented by the computer depicted in FIG. 1, for example.

This embodiment is applicable to a configuration where plural computers perform distributed, parallel processing via the network NW, where the CPUs and the shared memory 102 of FIG. 1 are provided at different computers (e.g., the mobile phone and the servers of FIG. 21).

As set forth hereinabove, in the case of an app having a strong real-time constraint, the performance thereof may drop consequent to the scheduling time if an assignment instruction is issued to a group master core of a group, causing the group master CPU performs the assignment. Thus, a given app is assigned to a predetermined CPU for prompt execution, thereby preventing the performance of the given app from dropping consequent to the influence of the scheduling. Furthermore, in the case of a concurrent occurrence of instructions to invoke plural apps, the load for the scheduling by the general master CPU can be reduced.

The predetermined CPU is determined based on whether an app is being executed by each of CPUs of the multi-core processor. This enables an app having a strong real-time constraint to be executed without conflicting with other apps on the CPUs, thereby preventing drops in app performance.

In a case of an app having a strong real-time constraint, an assignment instruction is issued to a group master CPU of a group, causing the group master core performs the assignment, whereby the load of the general master CPU can be reduced.

The CPU having the longest elapsed time since the assignment of an app is determined as the predetermined CPU. A CPU having the longest elapsed time has a low possibility of the application under execution being an application with a high urgency such as having a strong real-time constraint, and consequently, an app having a strong real-time constraint can be preferentially executed.

In a case where an app having a strong real-time constraint is assigned to a predetermined CPU, the rate of access of a shared resource by the predetermined CPU is set to be higher than before the assignment of the app. This can prevent the predetermined CPU from contending with other CPUs when accessing the shared resource and can prevent the app execution performance from dropping as a result of access contention.

In a case where an app having a strong real-time constraint is assigned to a predetermined CPU, the secondary cache shared by the group to which the predetermined CPU belongs is prevented from being used by CPUs other than the predetermined CPU of the group. Consequently, access of the secondary cache does not conflict, whereby drops in the app execution performance arising from access contention can be prevented.

The control method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to an aspect of the multi-core processor system and the control method, drops in app execution performance attributable to the scheduling can be prevented.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core processor system comprising:
a multi-core processor that has a plurality of core groups; and
a storage device that stores a plurality of applications, the multi-core processor is configured to:
determine, whether an application invocation has been received, wherein a receiving unit of a general master processor determines whether the application invocation has been received when a particular application of plurality of applications is stacked in a wait queue;
in response to determining that the application invocation has been received, determine whether the particular application that sent the application invocation has a strong real-time constraint, wherein a determining unit of the general master processor determines whether the particular application has strong real-time constraint based on a flag associated with the particular application in a table;
in response to the particular application having strong real-time constraint, assign the particular application to a particular core of the plurality of core groups, wherein an assignment unit of the general master processor assigns the particular application based on identification information in a dispatch destination store;
otherwise, identify by the general master processor, a group of cores whose total load is the lowest;
assign the particular application to the identified group of cores; and
notify the identified group of cores of the assignment.

2. The multi-core processor system according to claim 1, wherein the general master processor is configured to decide the particular core based on whether each core of the multi-core processor is executing an application.

3. The multi-core processor system according to claim 2, wherein the storage device stores for each core of the multi-core processor, an assignment time of an application currently under execution at the core, and another core of the core group is configured to:

update in the storage device and after assigning the particular application, the assignment time of the core.

4. The multi-core processor system according to claim 3, wherein the the general master processor decides the particular core based on the assignment time after another core updates the running application load for the particular core.

5. The multi-core processor system according to claim 1, wherein the particular core is configured to notify a second identified core of the core group to which the particular core belongs, of a migration instruction to migrate a running application, other than the particular application, at the predetermined core to another core of the core group to which the particular core belongs, upon receiving an assignment of the particular application, and
the second identified core of the core group to which the particular core belongs is configured to execute a migration process to migrate the running application at the particular core to another core of the core group to which the particular core belongs.

6. The multi-core processor system according to claim 1, comprising a shared resource that is shared among the multi-core processor, wherein the particular core is configured to set upon receiving an assignment of the particular application from the general master processor, a rate of access of the shared resource by the particular core to be higher than before receiving the assignment of the particular application.

7. The multi-core processor system according to claim 1, comprising a cache shared by a core group to which the particular core belongs, wherein another core of the core group to which the particular core belongs is configured to refrain from accessing the cache when the given application is assigned to the particular core by the general master processor.

8. A control method of a multi-core processor that has a plurality of core groups for assigning plurality of applications, the control method comprising;
determining, whether an application invocation has been received, wherein a receiving unit of a general master processor determines whether the application invocation has been received when a particular application is stacked in a wait queue;
in response to determining that the application invocation has been received, determining whether the particular application that sent the application invocation has a strong real-time constraint, wherein a determining unit of the general master processor determines whether the particular application has strong real-time constraint based on a flag associated with the application in a table;
in response to the particular application having strong real-time constraint, assigning the particular application to a particular core of the plurality of core groups, wherein an assignment unit of the general master processor assigns the particular application based on identification information in a dispatch destination store;
otherwise, identifying by the general master processor, a group of cores whose total load is the lowest;
assigning the application to the identified group of cores; and
notifying the identified group of cores of the assignment.

* * * * *